US009828874B2

(12) United States Patent
Grelin et al.

(10) Patent No.: US 9,828,874 B2
(45) Date of Patent: Nov. 28, 2017

(54) ANNULAR COVER DELIMITING A TURBOMACHINE LUBRICATION CHAMBER

(71) Applicant: Techspace Aero S.A., Herstal (Milmort) (BE)

(72) Inventors: Hervé Grelin, Villeblevin (FR); Didier Honore, Liege (BE)

(73) Assignee: SAFRAN AERO BOOSTERS SA, Herstal (Milmort) (BE)

( * ) Notice: Subject to any disclaimer, the term of this patent is extended or adjusted under 35 U.S.C. 154(b) by 343 days.

(21) Appl. No.: 14/543,981

(22) Filed: Nov. 18, 2014

(65) Prior Publication Data
US 2015/0139784 A1 May 21, 2015

(30) Foreign Application Priority Data

Nov. 18, 2013 (EP) ..................................... 13193258

(51) Int. Cl.
*F01D 25/18* (2006.01)
*F01D 25/16* (2006.01)
*F01D 9/06* (2006.01)

(52) U.S. Cl.
CPC .......... *F01D 25/183* (2013.01); *F01D 9/065* (2013.01); *F01D 25/16* (2013.01); *F05D 2300/603* (2013.01); *Y02T 50/672* (2013.01)

(58) Field of Classification Search
CPC ........ F01D 25/18; F01D 25/183; F01D 25/16; F01D 25/162; F01D 25/164; F01D 9/065; F05D 2300/603; Y02T 50/672
USPC .................. 384/99, 462, 475, 535, 537, 569
See application file for complete search history.

(56) References Cited

U.S. PATENT DOCUMENTS

| 4,714,139 A * | 12/1987 | Lorenz ............... B01D 19/0031 184/6.11 |
| 5,114,446 A * | 5/1992 | Giersdorf ................ F01D 25/18 55/345 |
| 6,142,729 A * | 11/2000 | Tran ...................... F01D 11/003 415/113 |
| 6,325,546 B1* | 12/2001 | Storace ................... F01D 21/04 384/536 |

(Continued)

FOREIGN PATENT DOCUMENTS

| EP | 1653052 A1 | 5/2006 |
| EP | 1662636 A2 | 5/2006 |

(Continued)

OTHER PUBLICATIONS

Search Report dated May 6, 2014 from European Patent Appl. No. 13193258.4.

*Primary Examiner* — Woody Lee, Jr.
*Assistant Examiner* — Eric Zamora Alvarez
(74) *Attorney, Agent, or Firm* — James E. Walton

(57) ABSTRACT

An annular cover for a lubrication chamber of a rotary bearing of a turbomachine. The cover includes a wall that is generally circular and flared with an orifice that is designed to receive a transmission shaft opposite an assembly surface for the cover, and at least one duct communicating with the inside of the wall and extending along the wall as far as the assembly surface. The duct is formed in the thickness of the body of the wall which is made from the same material, and which includes a composite material with a thermoplastic matrix and carbon fibers.

18 Claims, 4 Drawing Sheets

(56) References Cited

U.S. PATENT DOCUMENTS

| | | | | |
|---|---|---|---|---|
| 6,672,048 B2 * | 1/2004 | Johnstone | ............... | F02K 7/005 60/39.35 |
| 7,124,857 B2 * | 10/2006 | Gekht | ..................... | F01D 25/16 184/11.2 |
| 7,252,476 B2 * | 8/2007 | Prestel | ................... | F01D 25/08 415/111 |
| 7,699,530 B2 * | 4/2010 | Blais | ..................... | F01D 25/18 184/11.2 |
| 8,123,465 B2 * | 2/2012 | Largillier | ............... | F01D 9/065 415/115 |
| 2013/0101406 A1 * | 4/2013 | Kweder | ................ | B29C 70/46 415/200 |

FOREIGN PATENT DOCUMENTS

EP    2071141 A1    6/2009
FR    2925131 A1    6/2009

* cited by examiner

ANNULAR COVER DELIMITING A TURBOMACHINE LUBRICATION CHAMBER

This application claims priority under 35 U.S.C. §119 to European Patent Application No. 13193258.4, filed 18 Nov. 2013, titled "Annular Cover Delimiting a Turbomachine Lubrication Chamber," which is incorporated herein by reference for all purposes.

BACKGROUND

1. Field of the Application

The present application relates to an annular cover delimiting a lubrication chamber. More specifically, the present application relates to an annular cover delimiting a lubrication chamber of an axial turbomachine compressor. The present application also relates to a turbomachine having an annular lubrication chamber that is delimited on the upstream side by an annular cover.

2. Description of Related Art

The bearings of a longitudinal transmission shaft of an axial turbomachine are generally lubricated using an oil mist. This mist is contained within a sealed lubrication chamber, and the chamber is advantageously kept under negative pressure to prevent the oil leaking out. The chamber can be delimited on the upstream side by an annular cover that has ring seals. In particular, the annular cover may have two ring seals on the upstream side arranged in series about a shaft such as to form two consecutive sealing barriers in order to minimize losses.

The annular cover has an annular shape with a central opening on the upstream side and several pressurization channels distributed about the opening. The channels may be channels communicating with a compressor stage to pressurize the chamber directly.

According to other arrangements, the channels may be suction-driven oil recovery channels. These extend downstream from the upstream side to drain the oil into a lubrication circuit. For this purpose the turbomachine may include a suction system communicating with the channels. The channels generally open out downstream of the set of ring seals, and some channels can also open out between the ring seals such as to collect any oil that has passed through the seal directly in contact with the annular lubrication chamber.

Document FR 2 925 131 B1 discloses a sealing flange for a bearing lubrication chamber of an axial turbomachine. The flange is attached on the downstream side in the intermediate casing of the turbomachine and has two ring seals on the upstream side. The flange also has vents that are arranged between the seals and that extend radially. The vents are connected to pressurization pipes such as to pressurize the lubrication chamber through the seal on the downstream side. This arrangement makes it possible to pressurize a chamber and to reduce leaks. The flange thus formed has limited mechanical resistance and/or rigidity. Being installed in a turbomachine, it is subject to vibration. Under the effect of the inertia of same, the free upstream end thereof can oscillate and damage the seals assembled thereupon.

Although great strides have been made in the area of lubrication assemblies for turbomachines, many shortcomings remain.

DETAILED DESCRIPTION OF THE PREFERRED EMBODIMENT

Figure 1:
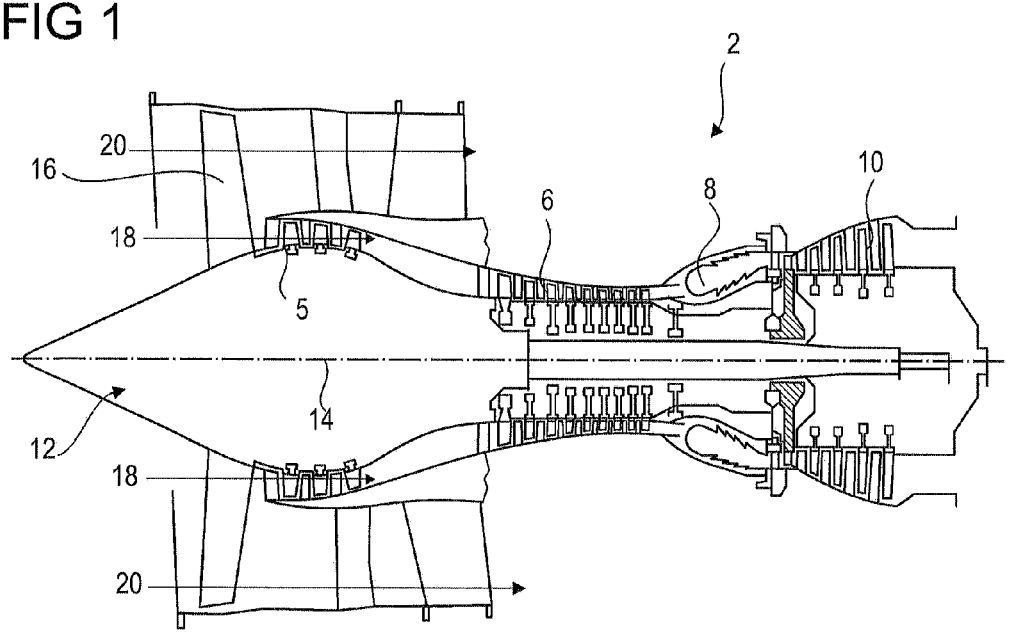
FIG. 1 shows an axial turbomachine according to the present application.

The present application aims to address at least one of the problems presented by the prior art. More specifically, the present application is intended to strengthen an annular cover for a lubrication chamber of a turbomachine. The present application is also intended to lighten an annular cover for a lubrication chamber of a turbomachine.

The present application relates to an annular cover for a lubrication chamber of a rotary bearing of a turbomachine, the cover comprising a wall that is generally circular and flared with an orifice at one end that is designed to receive a transmission shaft and an assembly surface for the cover at the other end; at least one duct communicating with the inside of the wall, which is noteworthy in that the or at least one of the ducts extends along the wall as far as the assembly surface.

According to an alternative embodiment of the present application, the duct or ducts are integrally formed with the wall, and preferably the duct or ducts and the wall are formed from a single piece.

According to an alternative embodiment of the present application, the duct or ducts are oil ducts with a minimum flow area of between 0.3 cm$^2$ and 15 cm$^2$, preferably between 0.6 cm$^2$ and 4 cm$^2$.

According to an alternative embodiment of the present application, the wall thickens along the length of the duct or ducts, and most of the duct is preferably positioned outside the wall.

According to an alternative embodiment of the present application, the duct extends generally parallel to the wall, and the duct preferably extends along most of the axial dimension of the cover, and more preferably the wall has a general profile of revolution, the duct extending essentially along the full radial distance of the profile of revolution of the wall.

According to an alternative embodiment of the present application, the width of the duct increases and/or the height of the duct decreases in the direction of the reduction of the diameter of the flared wall.

The height of the duct is measured perpendicular to the wall, and the width of the duct is measured perpendicular to the length and height of same.

According to an alternative embodiment of the present application, the duct has a radially oriented inlet positioned on the side of lesser diameter of the flared wall, and/or an axially oriented cylindrical outlet positioned on the side of largest diameter of the flared wall.

According to an alternative embodiment of the present application, the wall and the duct or ducts are made of a composite material, preferably a composite with carbon fibres and a thermoplastic matrix such as polyether ether ketone, polyetherimide or polyimide.

According to an alternative embodiment of the present application, the wall is made up of alternating truncated cone-shaped portions and tubular portions, and possibly a radially extending portion, said portions being arranged to form a generally flared whole.

According to an alternative embodiment of the present application, the cover has a radially extending annular attachment flange that includes the assembly surface, the duct passing through the annular attachment flange.

According to an alternative embodiment of the present application, the cover has a tubular bearing surface at the axial end thereof at the side of lesser diameter of the flared wall and/or it includes an internal cylindrical surface for receiving a ring seal, the receiving surface being delimited axially by a shoulder and by an annular groove, the cover preferably including a ring seal on the upstream side such as an annular layer of abradable material applied to the inside of the tubular bearing surface, and/or an internal ring seal such as a set of annular radial ribs assembled inside the receiving surface.

According to an alternative embodiment of the present application, the cover has two ring seals that are intended to cooperate with at least one rotor and that are arranged on the same axial half of the cover, the duct opening out axially between the two seals and communicating with the lubrication chamber through one of the seals.

According to an alternative embodiment of the present application, the or at least one of the ducts extends axially and/or radially as far as the assembly surface.

According to an advantageous embodiment of the present application, the annular attachment flange has attachment means such as attachment orifices that pass through it axially.

According to an advantageous embodiment of the present application, the attachment means are arranged on the assembly surface on a circle having a diameter less than the circle on which the outlets of the ducts are arranged.

According to an advantageous embodiment of the present application, the cover includes a first opening and a second opening axially opposed to the first opening, the diameter of the second opening being greater than the diameter of the first opening and being positioned on the side of greater diameter of the flared wall.

According to an advantageous embodiment of the present application, along the length of same, each duct has a radially extending portion, a generally flat portion, a change of section, a generally quadrangular portion, and a cylindrical portion According to an advantageous embodiment of the present application, the width of each duct lessens between the side of the flared wall of lesser diameter and the opposite side.

According to an advantageous embodiment of the present application, each duct has lateral partitions the height of which increases between the side of the flared wall of lesser diameter and the opposite side.

According to an advantageous embodiment of the present application, the duct or ducts and the wall are entirely formed from a single piece.

The present application also relates to an annular cover for a lubrication chamber of a rotary bearing of a turbomachine, the cover having an annular wall that is generally circular and flared and able to delimit at least one portion of the lubrication chamber, at least one duct communicating with the inside of the annular wall, being noteworthy in that the duct and the annular wall provide a continuous material formation extending generally along the entire length of the duct, the cover preferably including an assembly surface for the cover, the duct extending as far as the assembly surface.

The present application also relates to a turbomachine including an annular cover for a lubrication chamber for a rotary bearing, that is noteworthy in that the chamber cover is as claimed in the present application, and the turbomachine preferably also includes at least one compressor, at least one turbine, at least one transmission shaft linking the compressor to the turbine, an intermediate fan casing, a rotary bearing joining the transmission shaft to the intermediate casing, a lubrication chamber casing mounted sealingly on the intermediate fan casing and forming an axially oriented annular opening about the transmission shaft, the annular chamber cover being assembled on the chamber casing such as to close the axial annular opening.

According to an advantageous embodiment of the present application, the bearing is placed inside the annular cover, and the bearing is preferably an auxiliary bearing of a set of auxiliary bearings, the turbomachine also having a set of main bearings arranged to withstand most of the stresses of at least one of the transmission shafts of the turbomachine.

According to an advantageous embodiment of the present application, the cover has several ducts distributed about the circumference of same, the distribution of the ducts potentially being asymmetric, and the ducts preferably being arranged to be mainly positioned on the lower half of the cover when the turbomachine is in the assembled state.

According to an advantageous embodiment of the present application, the cover and the chamber case are made of different materials.

According to an advantageous embodiment of the present application, the material of the cover is lighter than the material of the chamber case, preferably at least twice as light.

According to an advantageous embodiment of the present application, the material of the chamber case is a longitudinal modulus of elasticity under traction that is greater than the material of the cover, preferably at least 20% greater.

The choice of materials for the cover and for the chamber case helps to optimize the mechanical resistance required to hold a bearing while reducing the mass of the whole.

According to an advantageous embodiment of the present application, at least one of the transmission shafts passes through the annular cover.

According to an advantageous embodiment of the present application, the maximum radius of the annular wall is greater than, preferably at least two times greater than, the axial length of the annular wall.

It should be understood that all of the features set out above can be combined.

The ducts and the wall provide a continuous material formation, which enables the duct to be used to reinforce the wall since the duct is part of the wall. The square profile of the duct helps to increase the rigidity and strength of the wall. The height of the duct increases in the direction of the attachment zone of the cover. This helps to increase the rigidity provided by the duct on the cover where it is subject to greater bending stresses, and to lighten the zones subject to lesser mechanical stresses.

All of the ducts form a frame bearing the wall that extends like an annular skin between the ducts. In this way, the wall can be thinned since most of the structural function is provided by the ducts. Consequently, the inertia of the cover is reduced, which makes it less susceptible to vibration. The ring seals placed at the axially opposing end of the intermediate casing are less likely to be damaged when the turbomachine vibrates.

The axial orientation of the ducts helps to improve the radial rigidity of the cover. The free end of same will undergo lesser radial oscillations for a given excitation amplitude. The flattened shape of the ducts helps to increase the torsional rigidity along the axis of revolution. This also helps to limit ovalization.

A composite body helps to lighten the cover, and therefore to reduce the consumption of an aircraft fitted with a turbomachine according to the present application. Furthermore, producing a composite cover by injection helps to generate savings since the cost of the mould can be amortized over a series of several hundreds or thousands of parts. Using a thermoplastic matrix helps to withstand the chemical attacks inherent in the oil mist, the temperature of which may exceed 100° C., and possibly 200° C.

As used herein, the terms inside or internal and outside or external refer to a position in relation to the axis of rotation of an axial turbomachine.

FIG. 1 is a simplified representation of an axial turbomachine. In this specific case, it is a dual-flow turbojet. The present application can also be applied to a triple-body turbojet generating a thrust greater than 360 kN, or to a turbomachine generating a mechanical power of more than 550 MW, the efficiency of which may exceed 60%.

The turbojet 2 has a first compression level, referred to as the low-pressure compressor 5, a second compression level, referred to as the high-pressure compressor 6, a combustion chamber 8, and one or more turbine levels 10, such as a low-pressure turbine and a high-pressure turbine.

When in operation, the mechanical power of the turbines 10 is transmitted to a rotor 12 and moves the compressors 5 and 6. Transmission is effected by means of concentric transmission shafts. Gearing means may increase the rotational speed transmitted to the compressors. Each turbine may be linked to one of the compressors via a transmission shaft.

The compressors have several rows of rotor blades associated with rows of stator blades. The rotation of the rotor about the axis of rotation 14 thereof thereby enables an air flow to be generated and progressively compressed until it enters the combustion chamber 10.

An inlet fan 16 is coupled to the rotor 12 and generates an airflow that is divided into a primary flow 18 passing through the different zones mentioned above of the turbomachine, and a secondary flow 20 that passes through an annular duct (partially shown) along the machine before rejoining the primary flow at the outlet of the turbine. The primary flow 18 and the secondary flow 20 are annular flows, and they are channelled by the casing of the turbomachine.

Figure 2:
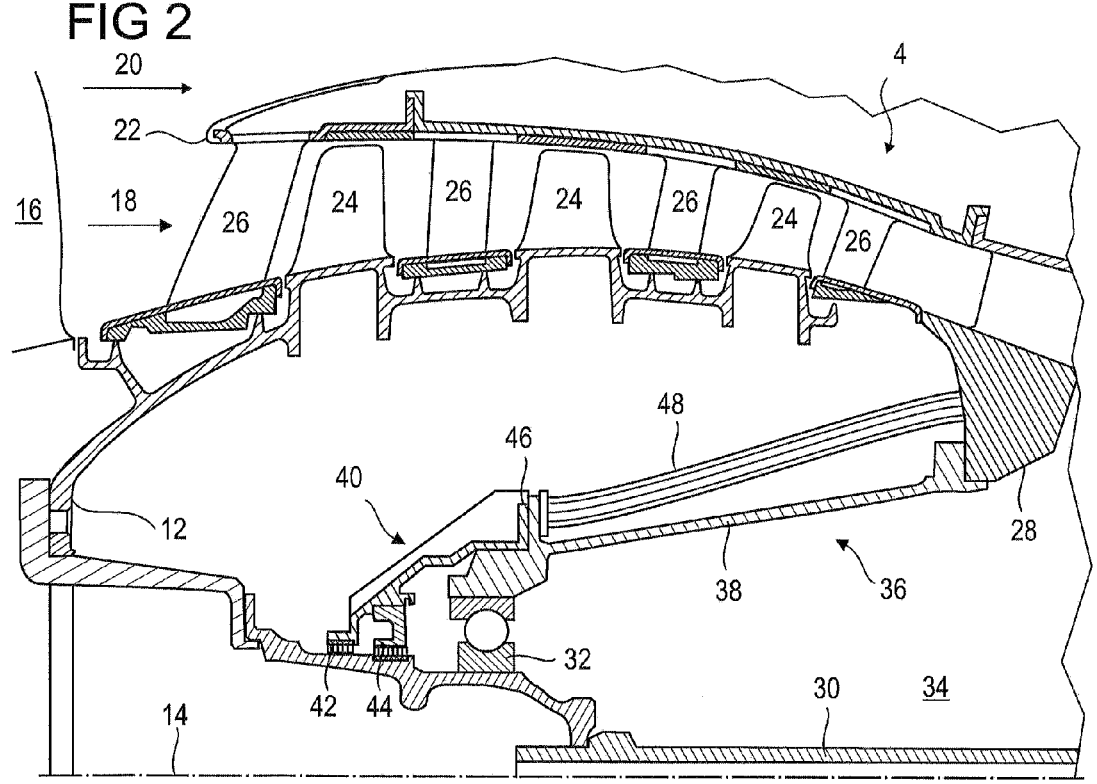
FIG. 2 is a diagram of a turbomachine compressor according to the present application.

FIG. 2 is a cross-section of a compressor of the axial turbomachine 2, such as the one in FIG. 1. The compressor may be a low-pressure compressor 5.

A part of the fan 16 and the separator tip 22 of the primary flow 18 and of the secondary flow 20 are shown. The compressor has several compression stages, each stage including an annular row of rotor blades 24 followed by an annular row of stator blades 26 to convert the speed of the flow coming from the row of rotor blades into pressure.

The turbomachine includes an intermediate fan casing 28 that can carry the fan, the compressors and the turbines. The turbomachine may include several transmission shafts 30, of which a first transmission shaft links the high-pressure compressor to the high-pressure turbine, and a second transmission shaft links the low-pressure compressor to the low-pressure turbine. The transmission shafts 30 may be directly joined together using at least one bearing such as a rolling bearing. Each transmission shaft 30 may be directly linked to the intermediate casing 28 via one or preferably two bearings 32, such as rolling bearings.

The turbomachine has a lubrication chamber 34 about at least one bearing 32 in which there is an oil mist. To delimit the lubrication chamber 34, the turbomachine may include a chamber casing 36 carrying a bearing 32. The bearing 32 may be an auxiliary bearing helping to limit the vibration of the transmission shaft 30, the turbomachine also having bearings designed to withstand most of the stresses of the rotor. The chamber casing 36 may be designed to deform radially in the event of vibration of a transmission shaft.

The chamber casing 36 has an annular partition 38 attached sealingly to the intermediate casing 28. The chamber casing 36 can carry one of the bearings 32 articulating one of the transmission shafts 30. It has a generally cylindrical shape. It can be made of metal such as steel or a titanium alloy.

The turbomachine includes an annular lubrication-chamber cover 40 or sealing flange. The annular cover 40 has an annular shape to enable it to sealingly close the annular opening formed between the chamber casing 36 and the transmission shaft 30, said opening opening axially upwards. The cover 40 can extend radially perpendicular to the bearing 32. The cover 40 includes and carries at least one ring seal, and preferably several ring seals 42 and 44 that cooperate sealingly with the transmission shaft 30, said seals (42, 44) being potentially arranged on a single axial half of the cover 40. Seal means an element that alone provides a seal against a surface or a seal portion, given that a seal may be formed by two portions. Such a two-part seal may be a labyrinth seal, or a seal with an annular layer of abradable material that cooperates with a set of annular radial ribs.

The cover 40 may surround the bearing 32 and a portion of the chamber casing 36. The cover 40 may be attached to the chamber casing 36 via a radially extending annular attachment flange 46.

In order to prevent the oil mist from escaping via the ring seals (42, 44), the lubrication chamber 34 may be kept under negative pressure. The turbomachine may include devices for maintaining positive pressure outside the lubrication chamber 34 and/or devices creating suction to lower the pressure inside the lubrication chamber 34. The turbomachine may include pipes 48 for maintaining suction and/or for collecting the oil from the oil mist, inter alia. At least one pipe 48 can cooperate with the cover 40 to maintain suction. The pipes can create positive pressure between the ring seals. The pipe 48 is advantageously arranged outside the chamber casing 36.

Figure 3:
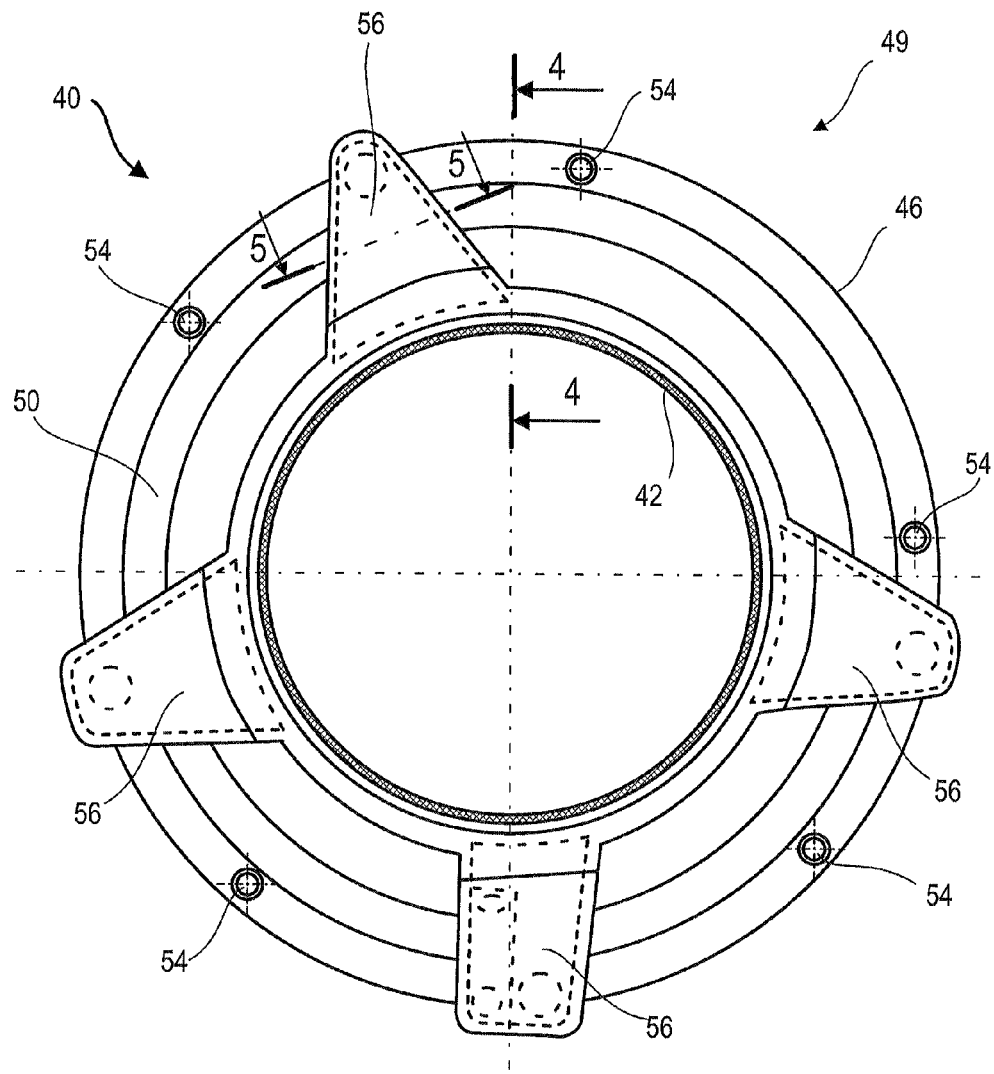
FIG. 3 is a front view of the cover according to the present application, as viewed from the upstream side.

FIG. 3 is a view along the axis of the annular cover 40 according to the present application, the cover being viewed from the upstream side to the downstream side.

The cover includes an integral body 49. It may be made of metal. It is advantageously made of a composite material with a thermoplastic matrix and fibres. The fibres may be short fibres of carbon or glass that are less than 10 mm long, and preferably less than 3 mm long. The matrix may be made of polyamide, polyetherimide (PEI) or polyether ether ketone (PEEK). It may be formed by injection of a resin loaded into an injection mould. Certain forms of ducts may be made using cores, which may be temporary.

The body 49 includes a main annular wall 50, which is generally flared or truncated cone-shaped. Flared means that the wall increases in diameter on one side and decreases in diameter on the other side. The main annular wall 50 makes it possible to sealingly delimit the lubrication chamber between the upstream end of the chamber casing and the seals 42 cooperating with the transmission shaft. The wall 50 can surround the chamber casing. The wall 50 is essentially short in relation to the diameter thereof, the maximum external radius thereof being greater, preferably at least three times greater, than the axial length thereof. Alternatively, the body may be a solid polyhedron in which is bored a truncated cone shape, the inside surface of which forms the annular wall.

The attachment flange 46 has attachment orifices 54 intended to cooperate with screws, studs or lock bolts to enable attachment to the chamber casing. It includes an assembly surface which may be flat and arranged on the downstream side, and which is intended to be pressed against the chamber casing to provide a seal.

The body 49 of the cover has at least one duct 56, such as an oil suction duct 56, and preferably several oil suction ducts 56 distributed about the cover 40. In this case, the cover 40 has four ducts 56. Each duct 56 extends radially. Each duct 56 extends along the annular wall 50. The ducts 56 create discontinuities on the wall 50, and they can extend radially beyond the attachment flange 46. Each one has the same axial and/or radial length.

Figure 4:
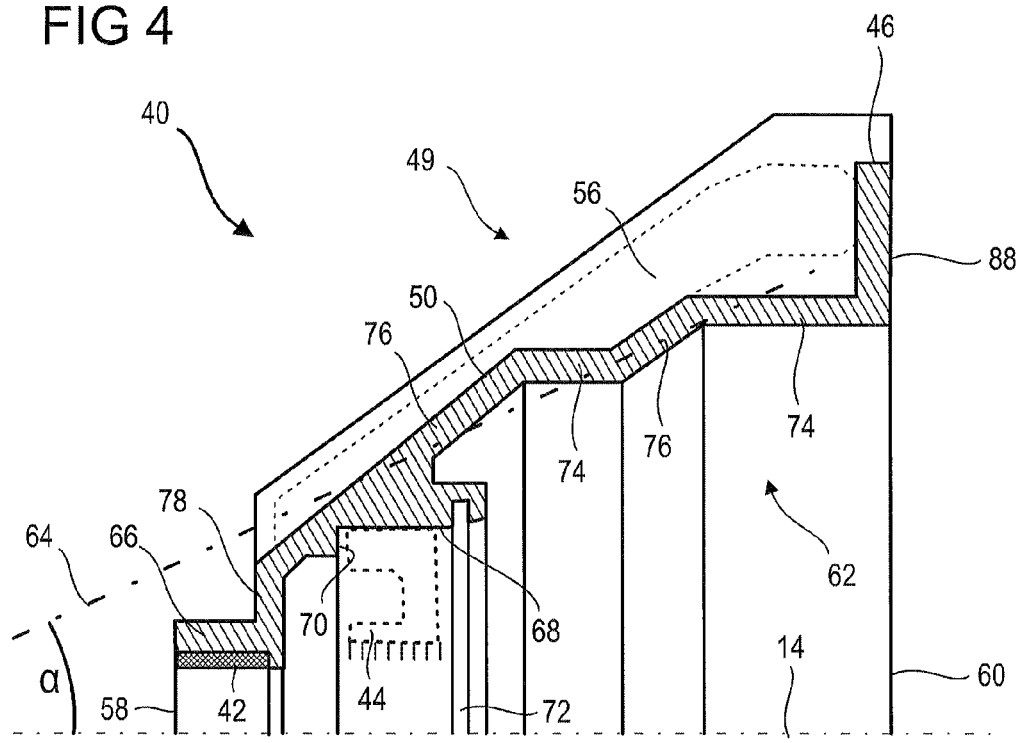
FIG. 4 is a cross-sectional diagram of the cover according to the present application along the axis 4-4 shown in FIG. 3.

FIG. 4 is a cross-sectional diagram of the cover 40 along the axis 4-4 shown in FIG. 3.

The cover 40 can have a generally annular shape with two axially opposed openings or orifices 58 and 60, through which the transmission shaft is intended to pass. The cover has an upstream orifice 58 on which is placed a ring seal, such as an upstream seal 42, and a downstream orifice 60 designed to cooperate with the chamber casing and of which the diameter is greater than the diameter of the upstream orifice 58.

The annular wall 50 has a profile of revolution 62 that is generally inclined in relation to the axis 14. The mean line 64 of the profile of revolution 62 of the annular wall 50 is inclined in relation to the axis 14 by an angle α of between 10° and 80°, preferably between 25° and 45°. The mean line 64 may be a least-squares line calculated on the basis of the contour of the profile of revolution 62.

The cover 40 may include an upstream tubular bearing surface 66 on which is placed the upstream seal 42, such as an annular layer of abradable material. The tubular bearing surface 66 may be formed jointly with the body. The thickness of the plate of the tubular bearing surface 66 may be less than the thickness of the annular wall 50.

The body may include an internal cylindrical assembly surface 68 for a ring seal. The assembly surface 68 may be delimited axially by a shoulder 70 and by an annular groove 72 formed in the body 49. The cover may include the internal ring seal 44, for example with a set of annular radial ribs intended to cooperate with a rotor, the internal seal 44 being assembled inside the assembly surface 68.

Each duct 56 extends axially across most of the cover 40, preferably essentially across the entire body 49 of the cover. Each duct 56 extends radially along most, and preferably essentially along all, of the profile of revolution 62 of the annular wall 50, and more preferably along more than the profile of revolution 62 of the annular wall 50. Each duct 56 extends along the profile of revolution 62 of the wall, and possibly along the external surface of the wall.

The wall 50 can have tubular portions 74 and truncated cone-shaped portions 76, which may be arranged alternatingly such as to increase the axial elasticity of the cover. The wall may also have at least one portion extending essentially radially 78, for example placed on the upstream side. These portions form steps. The portions together form a generally flared wall with a reduced diameter on the upstream side.

The body may also have a profile of revolution forming the wall, the attachment flange 46, and the internal seal-assembly surface 68.

Figure 5:
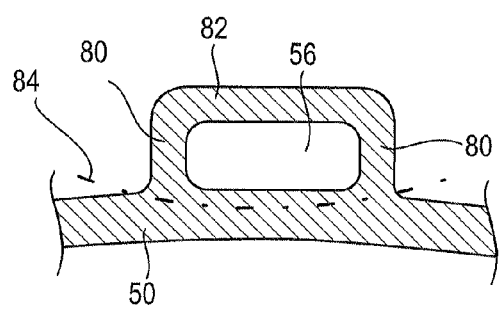
FIG. 5 is a cross-sectional diagram of the cover according to the present application along the axis 5-5 shown in FIG. 3.

FIG. 5 is a cross-sectional diagram of the cover 40 along the axis 5-5 shown in FIG. 3.

The duct 56 may have a rectangular profile. It has two opposed lateral partitions 80 that extend radially from the annular wall 50, and an external partition 82 or upper wall 82 linking the radially external ends of the lateral partitions 80. The combination of the partitions and the annular wall 50 defines a closed contour providing a continuous material formation forming, a reinforcement with a sealed passage. The profile of the duct can also be triangular or round.

The annular wall 50 and the material of the body that delimits the duct 56 have an interface 84 providing a continuous material formation that extends along the duct 56. According to another interpretation of the present application, the wall and the lateral partitions have two interfaces with continuous material formations extending along the duct. Each continuous material formation can extend along most of the length of the duct, preferably along essentially all of the duct. The longitudinal direction of the duct corresponds to an axis drawn between the ends thereof.

The body has variations in thickness depending on the circumference of same, and these may be observed on the external surface of same. It has thicker portions next to the ducts 56, and thinner portions on the wall 50 on either side of each duct 56.

Figure 6:
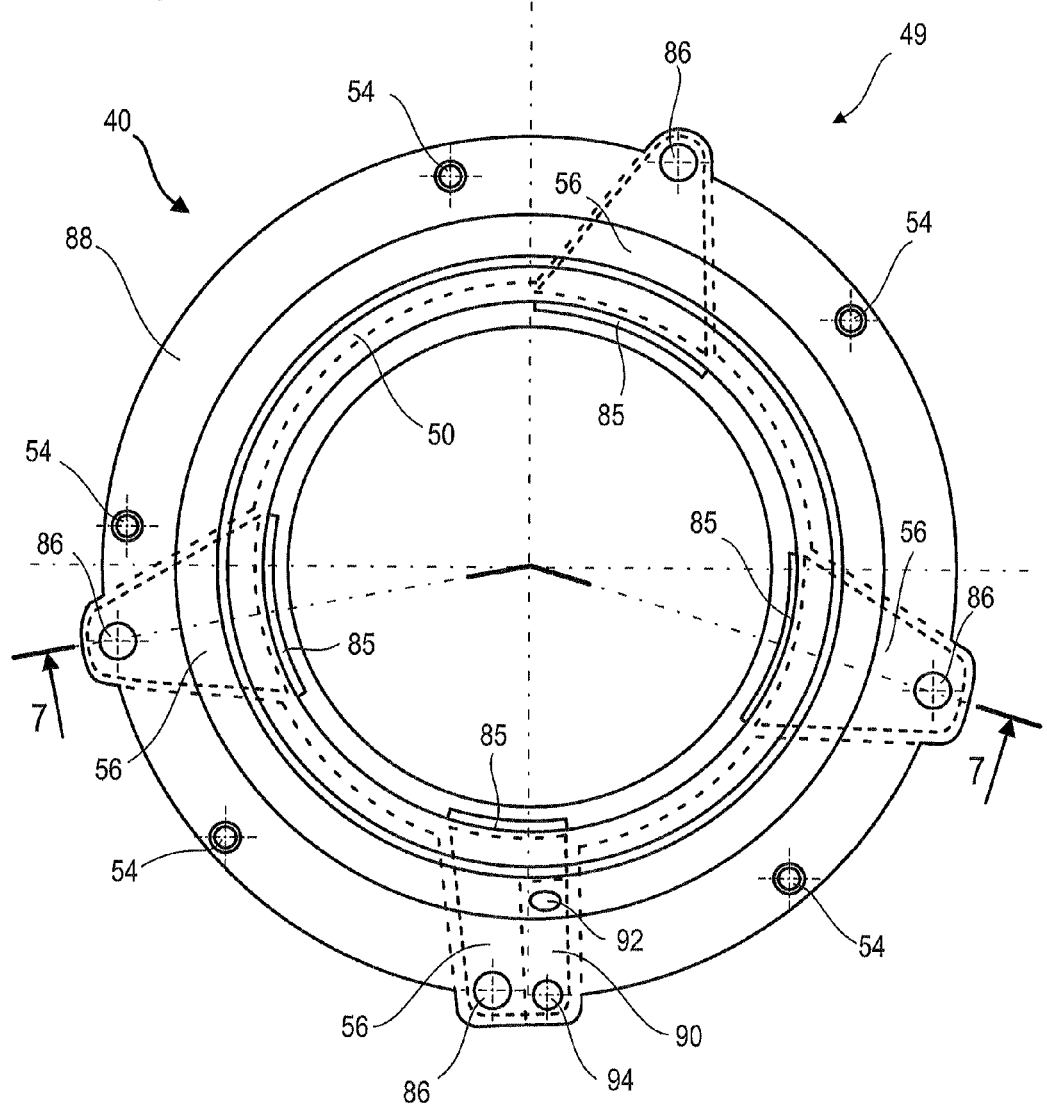
FIG. 6 is a rear view of the cover according to the present application, as viewed from the downstream side.

FIG. 6 shows an axial view of the cover 40, the cover being viewed from the downstream side towards the upstream side.

Each duct has an inlet 85 enabling oil to be suctioned, and an outlet 86 through which the oil is discharged. Each duct 56 is essentially sealed. The outlets 86 are arranged radially outwards on the downstream side, and each one is designed to be linked to a suction pipe. The outlets 86 are formed on the assembly surface 88 of the attachment flange 46. The flow area of the inlet 85 may be between 0.1 cm$^2$ and 50 cm$^2$, and the inlet may correspond to the minimum flow area of the corresponding duct.

The inlets 85 may be arranged radially inwards on the upstream side, and they may communicate with the lubrication chamber, potentially through a seal. They may take the form of radial slots. They are arranged on a single annular zone, and they may generally be arranged on the circumference thereof. The distribution thereof may be asymmetric. The positions thereof are overall separated by 90°, such as to enable suction under different flight conditions of an aircraft. The inlets 85 extend around the circumference of the cover 40. In total, they cover at least 10%, and preferably at least 25%, and more preferably at least 50%, of the circumference of the annular zone on which they are arranged.

Moreover, the cover 40 may include an oil suction channel 90. The channel 90 may be parallel to one of the ducts 56, preferably the lower duct. The channel 90 has an inlet 92 and an outlet 94 positioned on the assembly surface 88 in a manner similar to the outlets of the ducts 56. It is however shorter than said ducts since the inlet 92 thereof can be placed downstream of the internal ring seal (not shown) such as to suction directly from a deposit of liquid oil formed in the bottom of the lubrication chamber.

Figure 7:
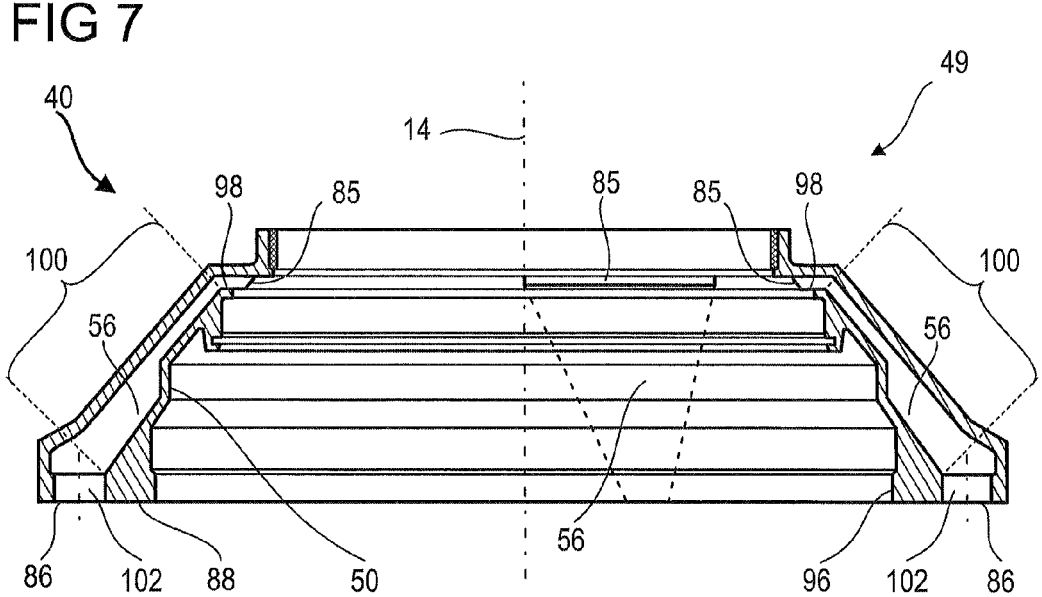
FIG. 7 is a cross section of the cover according to the present application along the axis 7-7 shown in FIG. 6.

FIG. 7 is a cross-sectional diagram of the cover 40 along the axis 7-7 shown in FIG. 6.

The cover 40 has a cylindrical positioning surface 96 designed to guarantee concentricity with the chamber casing. The chamber casing may include a matching positioning surface, the positioning surfaces being designed to ensure concentricity of less than 0.5 mm, preferably less than 0.05 mm. Orientation may be provided using an element such as a shaft or attachment means.

Each duct 56 has a variable flow area. Each duct 56 may include several portions with different flow areas. Moving from the upstream side to the downstream side, each duct may include a radial portion 98, an intermediate portion 100, and an axial portion 102. The radial portion 98 may form the inlet 85. The axial portion 102 may form the outlet 86 and have a cylindrical shape facilitating axial insertion onto the suction pipes when the cover is fitted axially onto the chamber casing.

The intermediate portion 100 may have a variable flow area. The intermediate portion 100 may fit the annular wall 50, and preferably fit the external surface of the annular wall. It may fit the step shapes of the wall 50. The intermediate portion 100 may be formed, potentially partially, within the thickness of the annular wall 50. It may pass through the wall. As such, the radii of the axial portions of the wall may be reduced such as to fit the elements placed on the inside. At least one or each duct 56 may have a variable height. The height may increase in the direction in which the wall 50 has an increased external diameter.

At least one or each duct 56 has a main direction between the inlet 85 and the outlet 86 thereof. The main direction is inclined in relation to the axis 14 by an angle of between 20° and 60°, preferably between 30° and 50°.

Alternatively, instead of being flared, the wall may be generally flat, which also enables the axial annular opening to be closed. In this embodiment, the ducts extend essentially radially.

It will be appreciated by those skilled in the art that the cover can be used elsewhere in the turbomachine. The cover can also be turned around to invert the upstream and downstream sides. In this case, the upstream and downstream dimensions of the cover can be inverted.

We claim:

1. An annular cover for a lubrication chamber of a rotary bearing of a turbomachine having an axis of rotation, comprising:
    an annular wall that is generally circular, said annular wall including a first end with a first diameter and a second end with a second diameter which is greater than said first diameter, the first end including an orifice intended to receive a transmission shaft and the second end including a cover assembly surface; and
    at least one duct communicating with an inside of the annular wall;
    wherein at least one of the ducts extends along the annular wall axially as far as the cover assembly surface and includes an outlet formed within the cover assembly surface, the outlet having an axis parallel to the axis of rotation.

2. The annular cover according to claim 1, wherein the at least one duct is integrally formed with the annular wall.

3. The annular cover according to claim 2, wherein the at least one duct is integrally formed with the annular wall, such that the at least one duct and the wall are formed from a single piece.

4. The annular cover according to claim 1, wherein the at least one duct is an oil duct with a minimum flow area which is comprised between 0.3 cm$^2$ and 15 cm$^2$.

5. The annular cover according to claim 4, wherein the at least one duct is an oil duct with a minimum flow area which is comprised between 0.6 cm$^2$ and 4 cm$^2$.

6. The annular cover according to claim 1, wherein the annular wall thickens along a length of the at least one duct, and at least 50% of the duct is positioned outside the annular wall.

7. The annular cover according to claim 1, wherein the at least one duct extends generally parallel to the annular wall, and the duct extends axially along at least 50% of the annular cover, and the annular wall has a general profile of revolution with a radial height, the at least one duct extending essentially along all the radial height of the general profile of revolution of the annular wall.

8. The annular cover according to claim 1, wherein the at least one duct includes a circumferential width and a radial height, wherein said circumferential width increases toward the first diameter and/or the radial height decreases toward the first diameter of the annular wall.

9. The annular cover according to claim 1, wherein the at least one duct has a radially oriented inlet positioned at the first end of the annular wall, and/or an axially oriented cylindrical outlet positioned at the second end of the annular wall.

10. The annular cover according to claim 1, wherein the annular wall and the at least one duct is made of a composite material.

11. The annular cover according to claim 10, wherein the composite material is made with carbon fibres and a thermoplastic matrix comprising one or more of the following:
    a polyether ether ketone;
    a polyetherimide; and
    a polyamide.

12. The annular cover according to claim 1, wherein the annular wall is made up of alternating truncated cone-shaped portions, tubular portions, and a radially extending portion, the truncated cone-shaped portions, the tubular portions, and the radially extending portion being arranged to form a generally flared whole.

13. The annular cover according to claim 1, further comprising:
    a radially extending annular attachment flange that includes the cover assembly surface, wherein the at least one duct passes through the annular attachment flange.

14. The annular cover according to claim 1, further comprising:
    a tubular bearing surface toward the first diameter of the annular wall;
    an internal cylindrical surface for receiving a ring seal, said cylindrical surface being delimited axially by a shoulder and by an annular groove, the cover including a ring seal toward the first diameter, including an annular layer of abradable material applied to the inside of the tubular bearing surface; and
    an internal ring seal, including a set of annular radial ribs assembled inside the internal cylindrical surface.

15. The annular cover according to claim 1, further comprising: two ring seals configured to cooperate with at least one rotor, the ring seals being arranged on a same axial half of the annular cover; wherein the at least one duct opens out axially between the two ring seals and one of the two ring seals separating the lubrication chamber from the at least one duct.

16. A turbomachine, comprising:
    at least one compressor;
    at least one turbine;

at least one transmission shaft linking the compressor to the turbine;

an intermediate fan casing;

a rotary bearing joining the transmission shaft to the intermediate casing;

a lubrication chamber casing mounted sealingly on the intermediate fan casing and forming an axially oriented annular opening about the transmission shaft; and an annular lubrication chamber cover mounted on the lubrication chamber casing so as to close the axially oriented annular opening, the annular lubrication chamber cover comprising:
- a first end and a second end axially opposed to the first end;
- an annular wall that is generally circular and flared with an orifice at the first end intended to receive the transmission shaft, and a cover assembly surface at the second end; and
- at least one duct radially opened toward the shaft and extending along an entire axial length of the annular wall as far as the cover assembly surface.

17. The turbomachine according to claim 16, wherein the rotary bearing is placed inside the annular cover.

18. An annular cover for a lubrication chamber of a rotary bearing of a turbomachine, comprising:
- an annular wall that is generally circular, said annular wall including a first end with a first diameter and a second end with a second diameter which is greater than said first diameter, the first end including an orifice intended to receive a transmission shaft and a cover assembly surface at the second end; and
- at least one duct communicating with an inside of the annular wall;
- wherein at least one of the ducts extends along the annular wall axially as far as the cover assembly surface;
- a tubular bearing surface toward the first diameter of the annular wall;
- an internal cylindrical surface for receiving a ring seal, said cylindrical surface being delimited axially by a shoulder and by an annular groove, the cover including a ring seal toward the first diameter, including an annular layer of abradable material applied to the inside of the tubular bearing surface; and
- an internal ring seal, including a set of annular radial ribs assembled inside the internal cylindrical surface.

* * * * *